No. 727,121. PATENTED MAY 5, 1903.
J. C. & A. D. FREDERICK.
TUBULAR CREAM SEPARATOR.
APPLICATION FILED DEC. 11, 1900.
NO MODEL.
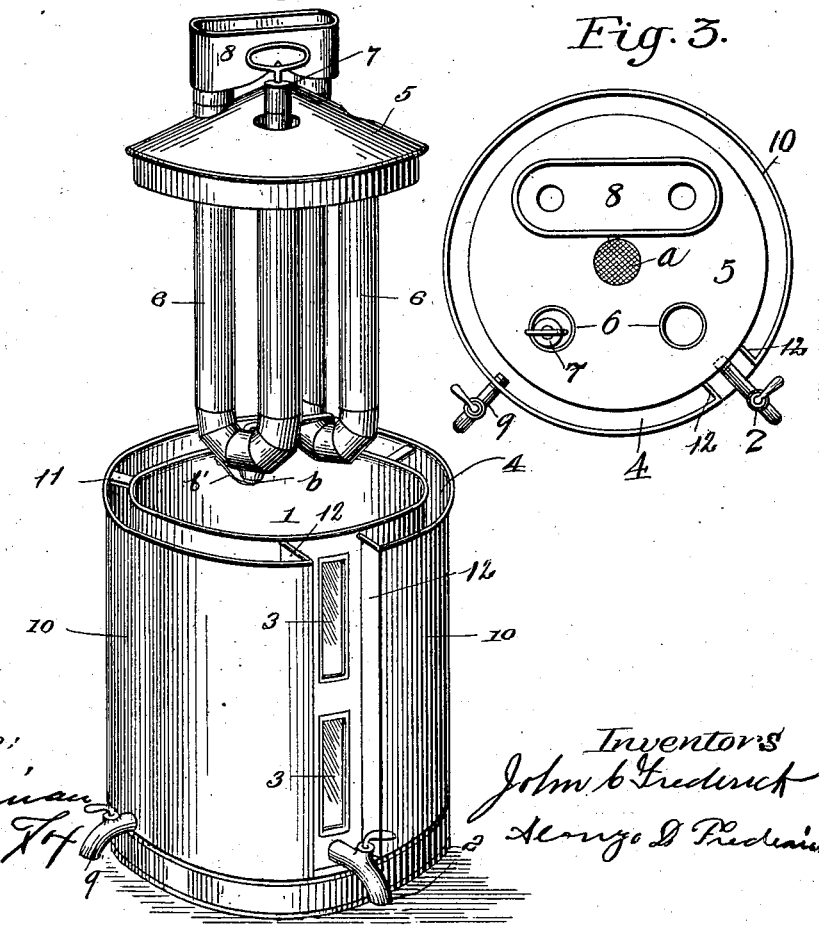

No. 727,121.

Patented May 5, 1903.

UNITED STATES PATENT OFFICE.

JOHN C. FREDERICK AND ALONZO D. FREDERICK, OF SIOUX FALLS, SOUTH DAKOTA.

TUBULAR CREAM-SEPARATOR.

SPECIFICATION forming part of Letters Patent No. 727,121, dated May 5, 1903.

Application filed December 11, 1900. Serial No. 39,576. (No model.)

*To all whom it may concern:*

Be it known that we, JOHN C. FREDERICK and ALONZO D. FREDERICK, citizens of the United States, residing at Sioux Falls, in the county of Minnehaha and State of South Dakota, have invented certain new and useful Improvements in Tubular Cream-Separators; and we do hereby declare the following to be a full, clear, and exact description of the invention, such as will enable others skilled in the art to which it appertains to make and use the same.

Our invention relates to that class of cream-separators in which water and air are utilized in the separation of the cream from the milk; and it consists of the peculiar construction and novel arrangement of the various parts of the apparatus, as will be hereinafter fully described, and particularly stated in the claims.

The principal object of the invention is to obtain a rapid and thorough separation of the cream from the milk, and this and other objects are attained by means of the apparatus illustrated in the drawings, in which—

Figure 1 is a side elevation of our improved apparatus, partly broken away around the water-draw-off faucet to show the water-chamber; Fig. 2, a perspective view of the can proper and the water-tubes separated, and Fig. 3 a plan view of the top.

In the several views the numeral 1 indicates the milk-reservoir, provided with a draw-off faucet 2 and with upper and lower transparent panels 3 3, the latter being for the inspection of the milk during the process of separation and drawing off.

A water-chamber 4 is formed around the milk-reservoir by a jacket or casing 10, provided with a suitable bottom and base, as shown, and with a suitable draw-off faucet 9, communicating with the water-chamber. The milk-reservoir is suspended from the top of the jacket or casing by means of brackets 11, and the side edges of the jacket or casing are turned in and secured to the wall of the milk-reservoir on each side of the transparent panels, as shown at 12 12.

The milk-reservoir is provided with a conically-shaped cover 5, and in the apex of said cover is a wire-gauze $a$, which adapts the cover when reversed to be used as a strainer for straining the milk into the reservoir. Attached to the cover are two depending U-shaped water-tubes 6 6, one end of each being secured flush with the upper surface of the cover, as shown, the other end of each projecting slightly above the cover and having attached thereto a funnel 8, into which said ends open. The water-tubes extend down into the milk-reservoir to within a short distance of its bottom, and located in one of the arms of one of said tubes is a pump 7, the bottom of which is provided with a suitable valve $b$, held normally closed by a spring $b'$. The lower end of the pump-tube passes through the bottom of the water-tube and is secured water-tight thereto. The pump-rod is provided with a suitable handle, as shown, by means of which the pump is operated.

In operating our separator the cover is reversed and the milk passed through the strainer until the required amount is put into the milk-reservoir, after which the strainer is cleaned and the cover replaced in normal position. Cold water is now applied to the funnel 8 and passing through the water-tubes overflows and runs down the upper surface of the cover into the water-chamber surrounding the milk-reservoir, passing out through the water-draw-off faucet when running water is being used, thus causing a continuous current to pass through and around the milk. A small quantity of water—say from half a pint to a pint—is poured into the pump and the pump operated for about two minutes and then at intervals for about ten minutes. Practically complete separation will take place in about forty minutes. After the cream has become separated from the milk the latter is drawn off through the faucet 2, the transparent panels permitting inspection during the operation. After the milk has been drawn off the cream can be removed through the same faucet.

It will be obvious that the colder the water the more rapid the separation and that the thorough circulation of the water through and around the milk and the infusion of air in the fatty substances thereof causes a rapid and substantially complete separation of the cream from the milk. It will be understood that the strainer *a* also serves as a vent for the escape of the odors arising from the animal heat in the milk.

Having thus fully described our invention, what we claim as new, and desire to secure by Letters Patent, is—

1. In a cream-separator, the combination with a milk-reservoir and a water-chamber surrounding the same, of a top or cover provided with one or more bent water-tubes, said tubes having a supply end and an overflow end, substantially as specified.

2. In a cream-separator, the combination with a milk-reservoir and a water-chamber surrounding the same, of a top or cover provided with one or more bent water-tubes, said tubes having a supply end and an overflow end, and a pump located in one of the water-tubes and connecting with the milk-reservoir, as and for the purpose specified.

3. In a cream-separator, the combination with a milk-reservoir and a water-chamber surrounding the same, of a top or cover provided with an air-vent and having attached thereto one or more bent water-tubes, said tubes having a supply end and an overflow end, substantially as specified.

4. In a cream-separator, the combination with a milk-reservoir and a water-chamber surrounding the same, of a top or cover provided with an air-vent and having attached thereto one or more U-shaped water-tubes, said tubes having supply ends and overflow ends, and a pump located in one of said tubes and connecting with the milk-reservoir, as and for the purpose specified.

5. In a cream-separator, a vessel for retaining the milk, a removable cover fitted to the top of the vessel, a plurality of open-top tubes fixed in apertures in the cover and connected at their lower ends by horizontal sections, as and for the purpose described.

In testimony whereof we have signed our names to this specification in the presence of two subscribing witnesses.

JOHN C. FREDERICK.
ALONZO D. FREDERICK.

Witnesses:
RALPH W. PARLIMAN,
JOHN C. FOX.